US00RE43722E

(19) United States
(12) Reissued Patent
Kennedy et al.

(10) Patent Number: US RE43,722 E
(45) Date of Reissued Patent: Oct. 9, 2012

(54) THREE-DIMENSIONAL LADAR MODULE WITH ALIGNMENT REFERENCE INSERT CIRCUITRY

(75) Inventors: John Kennedy, Irvine, CA (US); David Ludwig, Irvine, CA (US); Christian Krutzik, Costa Mesa, CA (US)

(73) Assignee: Aprolase Development Co., LLC, Wilmington, DE (US)

(21) Appl. No.: 12/607,253

(22) Filed: Oct. 28, 2009 (Under 37 CFR 1.47)

Related U.S. Patent Documents

Reissue of:
(64) Patent No.: 7,436,494
Issued: Oct. 14, 2008
Appl. No.: 11/706,724
Filed: Feb. 15, 2007

U.S. Applications:
(63) Continuation-in-part of application No. 10/806,037, filed on Mar. 22, 2004, now Pat. No. 7,180,579.

(60) Provisional application No. 60/785,135, filed on Mar. 24, 2006, provisional application No. 60/462,677, filed on Mar. 28, 2003.

(51) Int. Cl.
*G01C 3/08* (2006.01)

(52) U.S. Cl. ..... 356/4.01; 356/4.1; 356/5.01; 356/5.1

(58) Field of Classification Search ..... 356/3.01–3.15, 356/4.01–4.1, 5.01–5.15, 6–22, 28, 28.5
See application file for complete search history.

(56) References Cited

U.S. PATENT DOCUMENTS 644,968 A 3/1900 Burt (Continued)

FOREIGN PATENT DOCUMENTS

JP 11-355813 12/1999

OTHER PUBLICATIONS

Non-Final Office Action mailed on Apr. 15, 2009 in U.S. Appl. No. 11/499,403.

(Continued)

*Primary Examiner* — Luke Ratcliffe

(57) ABSTRACT

A 3-D LADAR imaging system incorporating stacked micro-electronic layers is provided. A light source such as a laser is imaged upon a target through beam shaping optics. Photons reflected from the target are collected and imaged upon a detector array though collection optics. The detector array signals are fed into a multilayer processing module wherein each layer includes detector signal processing circuitry. The detector array signals are amplified, compared to a user-defined threshold, digitized and fed into a high speed FIFO shift register range bin. Dependant on the value of the digit contained in the bins in the register, and the digit's bin location, the time of a photon reflection from a target surface can be determined. A $T_0$ trigger signal defines the reflection time represented at each bin location by resetting appropriate circuitry to begin processing.

A reference insert circuit inserts data into the FIFO registers at a preselected location to provide a reference point at which all FIFO shift register data may be aligned to accommodate for timing differences between layers and channels. The bin data representing the photon reflections from the various target surfaces are read out of the FIFO and processed using appropriate circuitry such as a field programmable gate array to create a synchronized 3-D point cloud for creating a 3-D target image.

32 Claims, 6 Drawing Sheets

U.S. PATENT DOCUMENTS

| | | | | |
|---|---|---|---|---|
| 3,897,150 | A | 7/1975 | Bridges et al. | |
| 4,574,331 | A | 3/1986 | Smolley | |
| 4,659,931 | A | 4/1987 | Schmitz et al. | |
| 5,198,657 | A | 3/1993 | Trost et al. | |
| 5,214,274 | A | 5/1993 | Yang | |
| 5,262,837 | A | 11/1993 | Shyy | |
| 5,274,430 | A | 12/1993 | Lux | |
| 5,426,566 | A | 6/1995 | Beilstein et al. | |
| 5,608,514 | A | 3/1997 | Stann et al. | |
| 5,682,229 | A | 10/1997 | Wangler | |
| 5,875,158 | A | 2/1999 | Schell | |
| 5,925,924 | A | 7/1999 | Cronin et al. | |
| 5,953,110 | A | 9/1999 | Burns | |
| 5,953,588 | A | 9/1999 | Camien et al. | |
| 6,031,601 | A | 2/2000 | McCusker et al. | |
| 6,042,388 | A | 3/2000 | Tustaniwskyj et al. | |
| 6,133,989 | A | 10/2000 | Stettner et al. | |
| 6,246,468 | B1 | 6/2001 | Dimsdale | |
| 6,264,476 | B1 | 7/2001 | Li et al. | |
| 6,384,519 | B1 * | 5/2002 | Beetz et al. | 313/103 CM |
| 6,414,746 | B1 | 7/2002 | Stettner et al. | |
| 6,444,968 | B1 | 9/2002 | Burt | |
| 6,522,396 | B1 | 2/2003 | Halmos | |
| 6,650,404 | B1 * | 11/2003 | Crawford | 356/5.01 |
| 6,791,171 | B2 | 9/2004 | Mok et al. | |
| 6,849,388 | B2 | 2/2005 | Clark | |
| 7,098,999 | B1 | 8/2006 | Halmos et al. | |
| 7,199,872 | B2 * | 4/2007 | Van Cranenbroeck | 356/139.03 |
| 7,265,993 | B1 | 9/2007 | Slone et al. | |
| 7,647,199 | B2 | 1/2010 | Green et al. | |
| 7,895,015 | B2 | 2/2011 | Parker et al. | |
| 7,941,759 | B2 | 5/2011 | Kreissl et al. | |
| 2002/0171133 | A1 | 11/2002 | Mok et al. | |
| 2003/0221313 | A1 | 12/2003 | Gann | |

OTHER PUBLICATIONS

Non-final Office Action issued in U.S. Appl. No. 12/287,691 and dated Jun. 28, 2011.

Notice of Allowance issued in U.S. Appl. No. 12/287,691 and mailed Jan. 11, 2012.

* cited by examiner

| Layer 1 | 0 | 0 | 0 | 0 | 0 | 0 | 0 | 0 | 0 | (1) | 0 | 0 | 0 | 0 | 0 |
|---|---|---|---|---|---|---|---|---|---|---|---|---|---|---|---|
| | Bin n | Bin 11 | Bin 10 | Bin 9 | Bin 8 | Bin 7 | Bin 6 | Bin 5 | Bin 4 | Bin 3 | Bin 2 | Bin 1 | Bin 0 | | |

** Reference Insert
(0)=Laser Silence
(1)=Laser Echo Return
X=Unfilled Bin
| Clock Cycle No. | | | | | | | | | | | | | |
|---|---|---|---|---|---|---|---|---|---|---|---|---|---|
| 0 | 0 | X | X | X | X | X | X | X | X | X | X | X | X |
| 1 | (1) | 0 | X | X | X | X | X | X | X | X | X | X | X |
| 2 | 0 | (1) | 0 | X | X | X | X | X | X | X | X | X | X |
| 3 | 0 | 0 | (1) | 0 | X | X | X | X | X | X | X | X | X |
| 4 | 0 | 0 | 0 | (1) | 0 | X | X | X | X | X | X | X | X |
| 5 | 0 | 0 | 0 | 0 | (1) | 0 | X | X | X | X | X | X | X |
| 6 | 0 | 0 | 0 | 0 | 0 | (1) | 0 | X | X | X | X | X | X |
| 7 | 0 | 0 | 0 | 0 | 0 | 0 | (1) | 0 | X | X | X | X | X |
| 8 | 0 | 0 | 0 | 0 | 0 | 0 | 0 | (1) | 0 | X | X | X | X |
| 9 | 0 | 0 | 0 | 0 | 0 | 0 | 0 | 0 | (1) | 0** | X | X | X |
| 10 | 1** | 0 | 0 | 0 | 0 | 0 | 0 | 0 | 0 | (1) | 0 | X | X |
| 11 | 1** | 1** | 0 | 0 | 0 | 0 | 0 | 0 | 0 | 0 | (1) | 0 | X |
| 12 | 1** | 1** | 1** | 0 | 0 | 0 | 0 | 0 | 0 | 0 | 0 | (1) | 0 |
| | Bin n | Bin 11 | Bin 10 | Bin 9 | Bin 8 | Bin 7 | Bin 6 | Bin 5 | Bin 4 | Bin 3 | Bin 2 | Bin 1 | Bin 0 |
*Fig. 7*
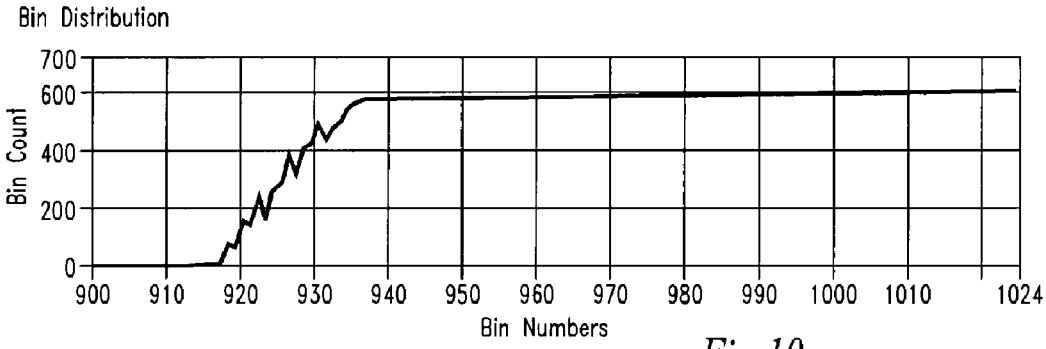
*Fig 10a*
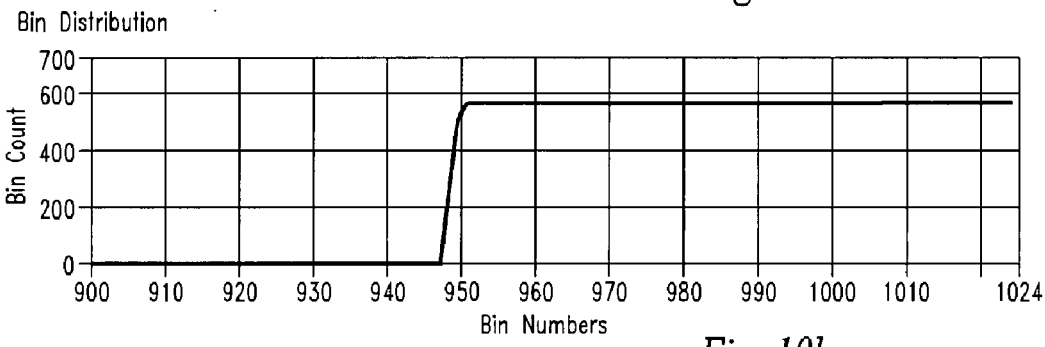
*Fig. 10b*

| Layer | Bin 140 | Bin 141 | Bin 142 | Bin 143 | Bin 144 | Bin 145 | Bin 146 | Bin 147 | Bin 148 | Bin 149 | Bin 150 | Bin 151 | Bin 152 | Bin 153 | Bin 154 | Bin 155 | Bin 156 | Bin 157 | Bin 158 |
|---|---|---|---|---|---|---|---|---|---|---|---|---|---|---|---|---|---|---|---|
| 1 | 0 | 0 | 0 | 0 | 0 | 1 | 1 | 0 | 0 | 0 | 0 | 0 | 0 | 0 | 0 | 0 | 0 | 0 | 0 |
| 2 | 0 | 0 | 1 | 1 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 1 | 1 | 0 | 0 | 0 | 0 | 0 | 0 | 0 | 0 | 0 | 0 | 0 |
| 4 | 0 | 0 | 0 | 0 | 0 | 0 | 0 | 0 | 0 | 1 | 1 | 0 | 0 | 0 | 0 | 0 | 0 | 0 | 0 |

*Fig. 9a*

| Layer | Bin 940 | Bin 941 | Bin 942 | Bin 943 | Bin 944 | Bin 945 | Bin 946 | Bin 947 | Bin 948 | Bin 949 | Bin 950 | Bin 951 | Bin 992 | Bin 953 | Bin 954 | Bin 955 | Bin 956 | Bin 957 | Bin 958 |
|---|---|---|---|---|---|---|---|---|---|---|---|---|---|---|---|---|---|---|---|
| 1 | 0 | 0 | 0 | 0 | 0 | 1 | 1 | 1 | 1 | 1 | 1 | 1 | 1 | 1 | 1 | 1 | 1 | 1 | 1 |
| 2 | 0 | 0 | 1 | 1 | 1 | 1 | 1 | 1 | 1 | 1 | 1 | 1 | 1 | 1 | 1 | 1 | 1 | 1 | 1 |
| 3 | 0 | 0 | 0 | 0 | 0 | 0 | 1 | 1 | 1 | 1 | 1 | 1 | 1 | 1 | 1 | 1 | 1 | 1 | 1 |
| 4 | 0 | 0 | 0 | 0 | 0 | 0 | 0 | 0 | 0 | 1 | 1 | 1 | 1 | 1 | 1 | 1 | 1 | 1 | 1 |

*Fig. 9b*

| Layer | Wall Location | Correction Amount |
|---|---|---|
| 1 | 945 | +5 |
| 2 | 942 | +8 |
| 3 | 946 | +4 |
| 4 | 949 | +1 |

*Fig. 9c*

| Layer | Bin 148 | Bin 149 | Bin 150 | Bin 151 | Bin 152 | Bin 153 | Bin 154 | ••• | Bin 948 | Bin 949 | Bin 950 | Bin 951 | Bin 992 | Bin 953 | Bin 954 | Bin 955 | Bin 956 | Bin 957 | Bin 958 | Bin 959 |
|---|---|---|---|---|---|---|---|---|---|---|---|---|---|---|---|---|---|---|---|---|
| 1 | 0 | 0 | 1 | 1 | 0 | 0 | 0 | ••• | 0 | 0 | 1 | 1 | 1 | 1 | 1 | 1 | 1 | 1 | 1 | 1 |
| 2 | 0 | 0 | 1 | 1 | 0 | 0 | 0 | ••• | 0 | 0 | 1 | 1 | 1 | 1 | 1 | 1 | 1 | 1 | 1 | 1 |
| 3 | 0 | 0 | 1 | 1 | 0 | 0 | 0 | ••• | 0 | 0 | 1 | 1 | 1 | 1 | 1 | 1 | 1 | 1 | 1 | 1 |
| 4 | 0 | 0 | 1 | 1 | 0 | 0 | 0 | ••• | 0 | 0 | 1 | 1 | 1 | 1 | 1 | 1 | 1 | 1 | 1 | 1 |

*Fig. 9d*

THREE-DIMENSIONAL LADAR MODULE WITH ALIGNMENT REFERENCE INSERT CIRCUITRY

Matter enclosed in heavy brackets [ ] appears in the original patent but forms no part of this reissue specification; matter printed in italics indicates the additions made by reissue.

CROSS REFERENCE TO RELATED APPLICATIONS

This application is [related] *a Broadening Reissue of U.S. patent application Ser. No. 11/706,724, filed Feb. 15, 2007 (now U.S. Pat. No. 7,436,494), which claims priority* to U.S. [provisional patent application] *Provisional Patent Application* No. 60/785,135, filed on Mar. 24, 2006, entitled[,] "Method for Image Jitter Reduction in a Multilayer LADAR Device" and is a [continuation-in-part] *Continuation-in-Part* of U.S. patent application Ser. No. 10/806,037, filed on Mar. 22, 2004, entitled[,] "Three-Dimensional Imaging Processing Module Incorporating Stacked Layers Containing Microelectronic Circuitry,"[,] (*now* U.S. Pat. No. 7,180,579), [issued Feb. 20, 2007 to Ludwig, et al.,] which claims the benefit of U.S. [provisional application] *Provisional Patent Application* No. 60,462,677, filed Mar. 28, 2003.[, all of which are] *U.S. Provisional Patent Application No. 60,785,135 and U.S. patent application Ser. No. 10/806,037 are both* incorporated herein by reference [and to which priority is claimed pursuant to 35 USC 119].

STATEMENT REGARDING FEDERALLY SPONSORED RESEARCH AND DEVELOPMENT

This invention was made with U.S. Government support under Contract No. DAAD17-01-D-0006-0002, awarded by the Army Research Laboratory (ARL). The U.S. Government has certain rights in the invention.

BACKGROUND OF THE INVENTION

1. Field of the Invention

The instant invention relates generally to the field of LADAR (laser-radar) imaging technology. Specifically, the instant invention relates to a device which allows three-dimensional laser imaging of, for instance, partially obscured or camouflaged targets with very high range resolution and sensitivity.

2. Description of the Related Art

In general, existing LADAR imaging systems include a laser source, appropriate optics in conjunction with a detector array, processing circuitry suitable for processing the detector array output into a usable form and post-processing circuitry and software capable of taking the processed detector array output and converting it into a usable format such as an image on an electronic display.

Current LADAR imaging methods typically comprise scanning a target with a series of laser pulses and detecting the reflected photons (also referred to as a laser echo) with a photon detector array such as a focal plane array. The time measured between the initiation of each laser pulse and the return of the corresponding laser echo reflected from the target to the photon detectors on the array is used to calculate target range and to define surface features on a three-dimensional object. Such imaging capability is valuable in situations where, for instance, a vehicle is camouflaged or obscured by foliage or in an urban environment when an imaging sensor can acquire only a limited or angular view of a target.

Because the time of flight of the returning laser echoes will vary based on the distance between the detector array plane and the individual surface features from which the echoes are received, a three-dimensional image of a target can be assembled based upon the relative echo delays calculated from the corresponding outputs of the individual detectors in the array.

As an example, a laser echo delay between two laser echoes (traveling at about the speed of light) of one nano-second ($10^{-9}$) suggests a target surface variation of about 15 centimeters. A similar laser echo delay of 500 picoseconds ($10^{-12}$) between two laser echoes translates into a target surface variation of about eight centimeters.

As is evident from these short time periods, very high detector signal processing and timing circuit speeds are desirable in order to resolve target surface feature variations at a centimeter-level depth resolution. Unfortunately, existing LADAR imaging systems lack the necessary circuit speed and capacity to achieve very high (i.e., centimeter) range resolution and sensitivity.

Alternative prior art imaging means include conventional passive visible sensors, such as CCD video sensors, which provide easily interpreted information to an observer. Nonetheless, these types of sensors are undesirable where accurate scene information in a complex video environment (i.e., camouflaged or partially obscured targets) is an important factor in the observer's decision-making.

Accordingly, a need exists for a LADAR imaging system that has the circuit speed and density required to achieve range resolution and sensitivity necessary to define small target surface variations based on picosecond time of flight differences in laser echoes.

The instant invention addresses the aforementioned problems in prior art devices by providing a reliable, high speed, high circuit density LADAR detector system and device capable of providing range resolution and sensitivity at a centimeter level.

BRIEF SUMMARY OF THE INVENTION

A first aspect of the present invention includes a photon source, such as a laser, beam shaping optics, a two-dimensional photo-detector array comprised of multiple photo-detector pixels, an optical lens for collecting reflected photons (laser echo) upon the detector array, and a processing module comprised of stacked layers of readout electronics integrated circuit chips (ROIC), wherein each ROIC-containing layer has one or more channels, each channel containing a digitizing and storage circuitry for processing the detector array output.

In a further aspect of the invention, external support circuitry is provided for the generating of a three-dimensional image on an electronic display from the output of the processing module.

In yet a further aspect of the invention, one or more alignment reference points are inserted at a predetermined point in the image capture cycle to allow the electronic alignment of selected sets of image data collected by the FIFO shift registers in the one or more channels in one or more ROICs contained in the processing module. In this aspect of the invention, alignment reference point insertion and alignment circuitry is provided as means to minimize layer-to-layer or channel-to-channel "jitter" which may be present due to variances in layer operating or data capture start-up characteristics. Alternatively, the invention allows a user to selectively insert an alignment reference point in an individual channel.

The enhanced imaging capability provided by the claimed invention is achieved, in part, by the use of stacked layers containing the ROIC circuitry, which increases detector output processing circuit density while minimizing circuit lead length and associated capacitance. The result of the stacked layers of ROIC circuitry is the ability to integrate a large (e.g., 128×128 or larger) detector array with associated dedicated detector readout circuitry (amplifier, threshold detector, sampling circuitry, analog to digital (ADC), digital to analog converters (DAC) and first in, first out, (FIFO) shift register "range" bins all within a very small module.

The resultant module permits the circuit speeds and densities required to resolve small, three-dimensional target features based on one or more laser echoes sensed by the detector pixels on the detector array while simultaneously providing dedicated processing channels for each detector on the detector array.

The multi-layer ROIC processing module is preferably comprised of a stack of layers containing thinned, integrated circuit chips, each layer including one or more receiver channels. Each channel comprises circuitry which detects the laser echo time from $T_0$ (the start of a laser pulse or a user-assigned $T_0$ point) to the time of laser echo return, based on the receipt of photons that are reflected from the imaged target surfaces. The laser echo time of flight information is pre-processed, and then converted to a digital bit or bits which are stored in a FIFO shift register comprising a set of "range bins" on the ROIC. A high bit in a range bin may, for instance, be designated as indicating the time of arrival of a laser echo, based on its position within the set of range bins.

The FIFO range bin data is preferably multiplexed out of the channels in the ROIC processing module to external post-processing circuitry which, in turn, aligns and interprets the data and converts it to a usable form, such as an electronic representation of 3-D point cloud for display as an electronic image on a screen.

While the claimed apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

BRIEF DESCRIPTION OF THE DRAWINGS

FIG. 7 reflects a data set showing reference line insertion data in a set of range bins in a FIFO shift register over multiple clock cycles.

FIGS. 9a, 9b, 9c and 9d show representative data sets in the FIFO of the invention in various states of data capture.

FIGS. 10a and 10b are exemplar output illustrations of pre-histogram processing and post-histogram processing of null image data in an eight layer module.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figures 1, 5:
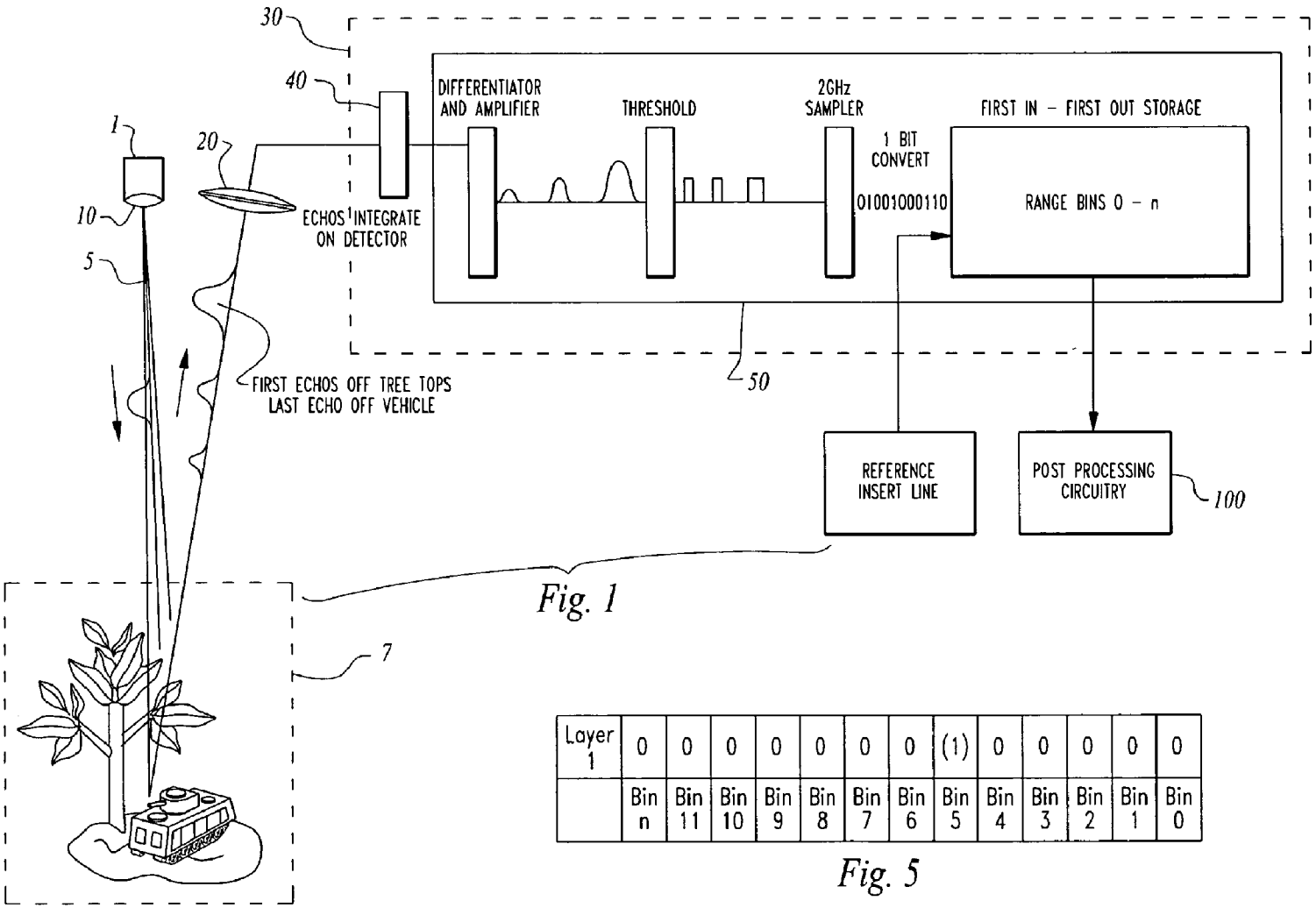
FIG. 1 is a block diagram of the present invention.
FIG. 5 reflects a data set in a single FIFO shift register after the register is filled.

Turning now to the figures wherein like numerals designate like elements among the several views, FIG. 1 shows a block diagram of the present invention.

A photon source, such as a laser 1, generates a beam pulse 5, which is directed toward a scene or target 7, through suitable beam-shaping optics 10.

In a preferred embodiment, laser 1 is a 1064 nm, mechanically aligned, 300 micro-Joule, seed YAG laser capable of producing a pulse width of 500 picoseconds. In the preferred embodiment, a beam amplifier is provided (not shown), such as a master oscillator power amplifier, wherein a seed beam is fed into the amplifier. In this preferred embodiment, the seed beam passes through a Faraday rotator and enters a four-pass, thermally-controlled amplifier which includes two pumped YAG diodes.

In the preferred embodiment, beam-shaping optics 10 is a beam-shaping holographic lens suitable for projecting a rectangular beam area on a target. It has been determined that a rectangular beam area optimizes the ability of a detector array to receive and process reflected photons in its field of view.

Beam 5 is preferably amplified to generate a detectable photon reflection off of a target having 10% reflectivity at 100 meters.

Suitable collection optics 20 are provided, preferably a 75-mm, F1.4 lens with an appropriate spectral filter for optimization of the selected laser pulse wavelength. Beam collection optics 20 are oriented so as to receive photons that are reflected from the imaged target 7, (i.e., the collective obscuration, subject and ground) and focus them upon the detector array as is discussed below.

After beam amplification, beam 5 may optionally be pre-aligned with the detector array by passing beam 5 through Risley prisms (not shown) to steer and rotate beam 5 for "bore sighting" to the detector array. It has been determined that placing beam-shaping optics 10 in close proximity to and aligned with collection optics 20 minimizes parallax error with respect to the two optical subassemblies.

Further included is sensor means such as a detector assembly 30 comprising an electronic sensor, such as a detector array 40 having a detector output signal and a multilayer readout electronics processing module 50 comprising one or more integrated circuit layers.

Detector array 40 is preferably a focal plane array comprising individual photo-detector pixels suitable for detecting reflected photons from a target and generating an output signal in response thereto. In the preferred embodiment, an InGaAs detector array is used. Irvine Sensors Corp., the assignee herein, has demonstrated a 128×128 InGaAs detector array with 40-micron active detectors on 50-micron centers in the disclosed invention, wherein a 128×8 set of detectors on the array were accessed.

Figure 2A:
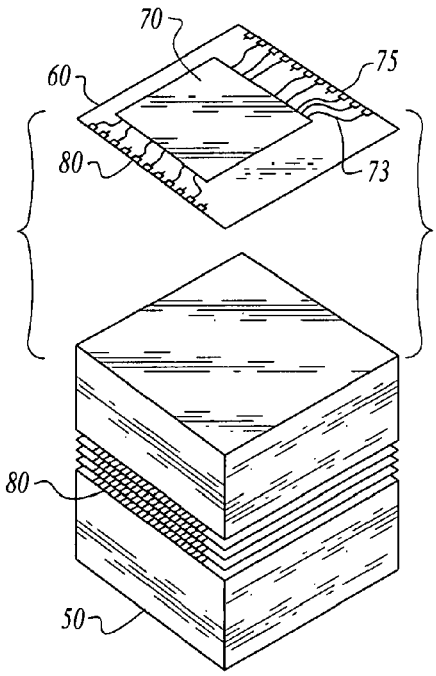
FIGS. 2a and 2b are perspective views of the individual layers and stacked configuration of the present invention
Figure 2B:
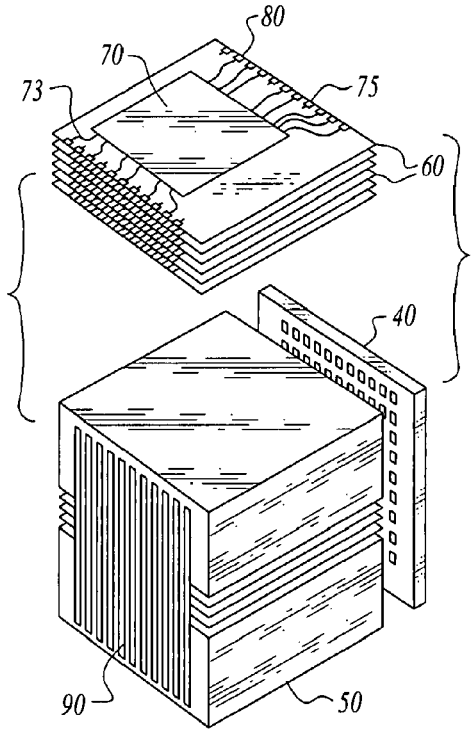
Figure 3:
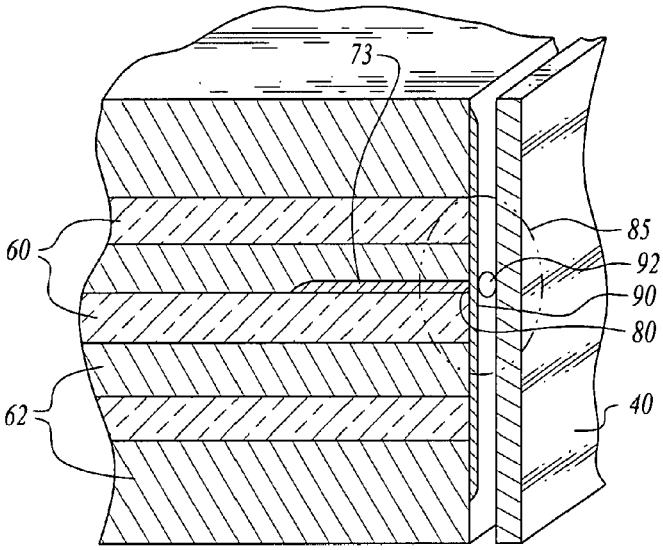
FIG. 3 is a cross-section the processing module of the present invention showing an exemplar T-connect and bump bond.

Turning now to FIGS. 2a, 2b and 3, processing module 50 includes a bonded stack of two or more layers 60, each layer containing one or more readout electronic integrated circuits or ROICs 70, preferably in the form of integrated circuit chips, for the processing of signals received from detector array 40. Each readout electronic circuit 70 comprises one or more channels 75 comprised of sensor-converting electronic circuitry for the converting of the electronic output of detector array 40 to a digitized data value comprised of one or more digital bits, a plurality of which comprise an image data set.

Individual layers 60 are formed so that appropriate input, output, power and ground paths of read-out electronic integrated circuits 70 are rerouted using metallized traces 73 to one or more edges of each layer 60 to form one or more access leads 80.

Layers 60 are bonded together using an appropriate adhesive 62 such as an epoxy to form a three-dimensional module and the lateral surfaces processed (e.g., ground or lapped) so as to expose conductive access leads 80. Layers 60 may optionally be thinned prior to bonding using techniques that are known in the field of semiconductor processing and packaging. Thinned active layers may also be embedded silicon cap chips for ease of handling.

Suitable interconnect pads or equivalent structures 90 are formed on one or more lateral surfaces of processing module 50 to form one or more "T-connects" 85 to allow the electrical connection of access leads 80 directly to the outputs of detector array 40 and to the image processing electronics in the stack such as by the use of conductive bumps 92.

FIG. 3 illustrates a cross-section of an exemplar T-connect 85 between a bump bond on a detector array 40 and a metallized access lead 80. The T-connect structures conveniently allow the interconnection of the high-density stack of layers to detector array 40 and external circuitry contained external of the processing module.

The preferred embodiment provides interconnect pads 90 formed on one or more processor module lateral surfaces so as to allow the electrical connection, such as by bump bonding, of detector array 40. Indium bump bonding is a preferred method of bump bonding in the disclosed invention.

After electrical connection of detector array 40, the volume occupied by perpendicularly disposed detector array 40 and processor module 50 is minimized yet the detector-to-readout circuitry lead length is optimized to increase speed while reducing parasitic capacitance. Such an interconnection orientation takes full advantage of the high circuit density of the processing module while providing very short circuit paths necessary for high-speed laser range resolution.

Referring back to FIG. 1, external electronic circuitry 100 for receiving and processing the output of processor module 50 may be connected to interconnect pads 90 through the use of compressible conductors such as "Fuzz Buttons" available from Technical Wire Products, Inc., as disclosed in U.S. patent application Ser. No. 11/499,403; filed Aug. 4, 2006, entitled High Density Interconnect Scheme, to Kennedy, which application is fully incorporated herein by reference.

Alternative means for connection of external electronic circuitry 100 to interconnect pads 90 include solder, conductive epoxies, wirebonding or other suitable means formed on the accessible conductive surfaces of processing module 50.

In system operation, beam 5 expands outward from beam-shaping optics 10 and is imaged upon the desired target. Photons from the pulsed beam 5 which are not absorbed or scattered by the target, are reflected and returned to collection optics 20 from the target surface. Because the distance between the differing target surfaces and collection optics varies, so will the time that the reflected photons are received by the detector assembly. Note that each individual detector in the detector array may receive multiple signal returns from photon reflections off of scene surfaces at different distances from the detector array.

Beam 5 is swept across the target area in a scan to attain, by way of example, 256 vertical samples. In this example, the laser is pulsed at 94 Hz to attain 256 horizontal samples while the channel data records any received laser echo in suitable storage circuit means such as a FIFO shift register for the storing of a digitized data value. In a preferred embodiment, storage circuit means comprises 1024 FIFO shift register range bin circuits. Each range bin circuit has a variable logic state and a unique position in the storage circuit.

Figure 4:
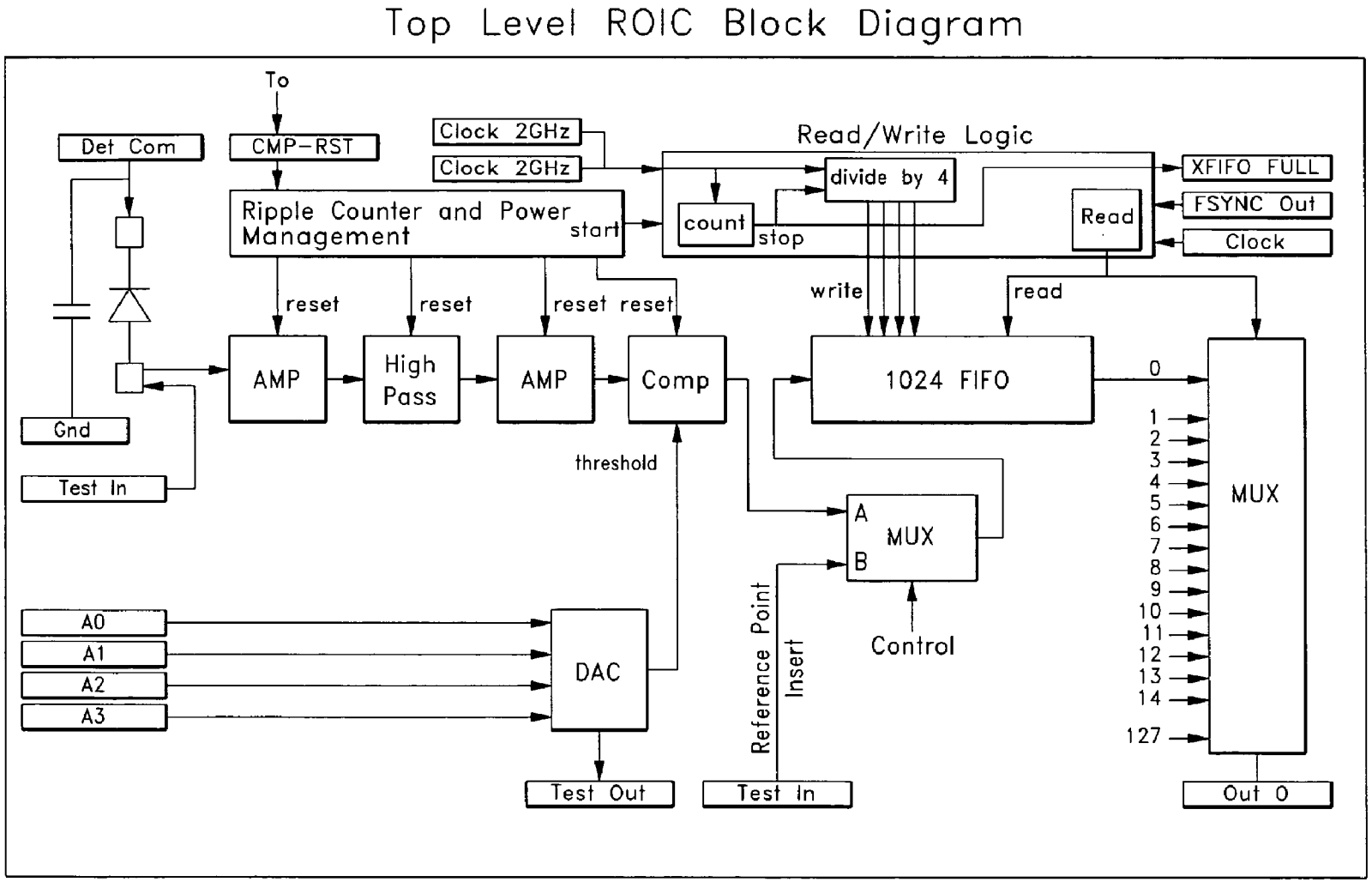
FIG. 4 is a circuit block diagram of the integrated circuit of the present invention.

An exemplar block diagram of a preferred embodiment of a channel on the ROIC chip is shown in FIG. 4. As indicated above, each ROIC chip is preferably comprised of multiple channels. As illustrated in FIGS. 1 and 4, each channel 75 provides a dedicated detector signal input circuit and includes circuitry that receives a $T_0$ trigger signal (initial laser pulse trigger) to provide the FIFO shift register with a reference for the time of the laser echo's arrival at detector array 40. The preferred laser pulse is short relative to the capture interval (e.g.–500 picoseconds vs. 500 nanoseconds) and multiple returns can be detected by a single detector pixel.

Each channel 75 is preferably comprised of an analog section that operates with a relatively high bandwidth. Each channel further comprises a digital section operating at, in a preferred embodiment, up to 2 GHz during the time the FIFO shift register is filling with data. A digital to analog converter is included in channel 75 as well as circuitry to allow a user to adjust an included comparator's threshold. Each ROIC is preferably provided with multiple channels (e.g., 128 channels).

Received laser echoes are integrated and filtered by the channel during an image capture interval. The integrated signals are then amplified and differentiated using suitable electronic circuitry for converting received echoes into electronic pulses with an amplified signal strength sufficient to allow detection by the comparator circuitry. The comparator circuitry detects whether the pulses are above or below a programmable predetermined threshold. In the preferred embodiment, the comparator's output is sampled at a 2 GHz rate, resulting in a one bit, analog to digital converted signal.

In the preferred embodiment, each channel 75 includes a 1024 deep, FIFO shift register (i.e., a 1024 bin shift register) which receives and stores the comparator's output from $T_0$ to $T_0$ plus approximately 500 nanoseconds. In a FIFO shift register bin set of 1024, this results in each bin representing a period of about 500 picoseconds, (i.e., 500 ns/1024 bins). Each bin in the FIFO has a position in the shift register and is capable of having a variable logic state (e.g., 0V=logical "0", +1.8V=logical "1"). A "1" or high bit in a FIFO register may be regarded as marker representing the arrival time of a laser echo with respect to the $T_0$ signal, as determined by the bit's location in the register. With the FIFO clocking at an exemplar 2 GHz rate, each bin of the shift register represents about 500 picoseconds of time history, which in turn, equates to about 7.5 cm of range history based on the laser echo traveling at about the speed of light.

The initiation point of the $T_0$ trigger signal is preferably variable by a user to allow system adjustment to accommodate for longer return times for laser echoes returning from more distant targets.

After the 1024 bins of the FIFO shift registers in the channels in the preferred embodiment are filled, the captured FIFO contents are read out to external processing circuitry 100. A preferred method of reading out the FIFO register data is by multiplexing the digitized FIFO data out to external processing circuitry 100 using conventional frame and line signals at a 20 MHz rate. The multiplexed data may be processed at this point using appropriate external circuitry to create a 3-D point cloud defined by the target and further processed to create a 3-D electronic image or may be further processed to minimize jitter as discussed below.

The 256×256×1024 data is recorded as a frame. Multiple frames of FIFO image data are electronically registered and coalesced into a 3-D point cloud in suitable external electronic circuitry for display as a 3-D image for classification of target objects.

FIG. 5 illustrates an exemplar set of image data that have been captured on a channel in a set of 0-n FIFO register bins on an ROIC layer X from a returning laser echo. It can be seen that during the capture cycle in which the bins in layer X were filling, a laser echo was received in bin 5 as a logical 1. The logical 1 at bin 5 can be used to calculate the time of flight of the initial laser pulse and its return, which in turn is used to calculate the distance of the surface from which the laser was reflected.

Because multiple ROIC layers in a high-speed LADAR system (e.g., GHz clock speeds) do not necessarily begin acquiring data at precisely the same instant, the individual layers may capture data asynchronously with respect to the other layers in the stack. In an alternative preferred embodiment, layer-to-layer asynchronous data capture or jitter resulting from variances in layer-to-layer operation is minimized by inserting a digital alignment reference point or "brick wall" at about the end of each image data capture cycle at the same point in time in each selected channel during range bin filling. A reference insert circuit means is provided for inserting one or more user-defined reference points at one or more predetermined positions in the image data set.

Layer-to-layer jitter can then be minimized by realigning the inserted alignment reference points on each layer to each of the other layers, thus shifting the images of the layers (i.e., image data sets) into alignment.

When a 3 D image is being captured, a solid electronic "wall" of logical "1"s is asserted on the reference point insert line which is common to all FIFO inputs in each of the layers, and is seen in the set of selected bins as an electronic alignment point. This method and device rely on the fact that when the bulk of the data have been sampled, the alignment reference point insert line is activated and, from that data capture point forward, all inputs into the FIFO shift registers are registered as logical "1"s.

The alignment reference points are inserted using appropriate reference insert circuit means in electrical connection with at least one preselected bin circuit (e.g. a data input port or TESTIN herein) in the FIFO shift registers for selectively asserting a user-defined predetermined bin logic state in at least one preselected bin circuit in the FIFO shift register in one or more ROIC channels. Using a common input into the FIFO in each layer in the stack allows the insertion of the alignment reference point into the incoming image data at a user defined point in time. Upon readout of the image data from the FIFO in which the alignment reference point has been inserted, a histogram on each of the layers' data is performed to determine the alignment reference point position of each layer to define the realignment point for all data sets.

Figure 6:
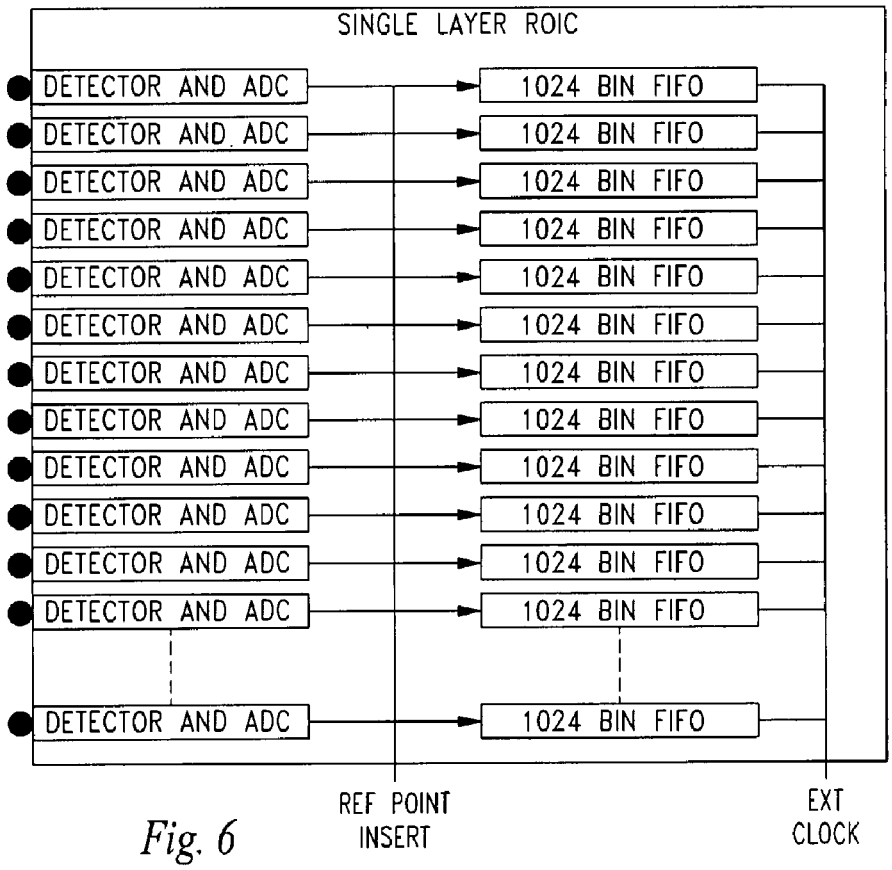
FIG. 6 illustrates selected circuit elements in a single layer ROIC.

Turning now to FIG. 6, a block diagram is shown reflecting an exemplar single layer of the ROIC inside a 3 D laser imaging system. Each detector is in electrical connection with an amplifier, which detector output undergoes an analog to digital conversion.

The digitized output is received by the FIFO at the data input port of the shift register, which, in this example, can store 1024 consecutive samples of data. In the illustrated embodiment, the resulting image size is (number ofpixels)(1)(1024). Multiple layers are stacked to form a three-dimensional image, i.e., eight layers of an ROIC would provide an image of 68×8×1024 pixels.

FIG. 7 shows a basic illustration of the operation of the reference insert line in a FIFO shift register having 0-n bins in LADAR system in an exemplar 13 clock cycles.

In FIG. 7, the Xs represent "don't care" states that are unfilled bins in a FIFO shift register during an image capture cycle.

At clock cycle 0, the digitized output of a detector is received by the input bin in the FIFO shift register. In this instance, the input is a logical 0. In this embodiment, the logical 0 represents no laser echo captured by the detector in clock cycle 0.

At clock cycle 1, a digitized laser echo is received, resulting in a logical 1 being received into the FIFO bin set.

At clock cycles 2-8, the FIFO shift register bins continue to fill with and shift data from the output of the detector in the system.

Turning to clock cycle 9, a predetermined insert time has been selected, in this instance, at about bin 3, wherein at the point in time where detector data (either 0 or 1) has been received by bin 3, the reference insert line is activated such that alignment reference points are fed into and received by the FIFO shift register bins in each of the layers. Logical "1"s from the reference insert line will continue to be received by the bins in the shift register until the entire set of bins is full (e.g., clock cycle 12 in this example) at which time, the entire data set from the channel is read out for further data aligning and processing as discussed further below.

Because the data sets that are read out contain reference points for use in aligning other data sets therewith, it is possible to remove jitter associated with the asynchronous operation of each layer by performing a histogram calculation such as a simple cumulative histogram. Reference point synchronization circuit means is provided for performing such histogram calculations which means can desirably be implemented in a field programmable gate array.

Figure 8:
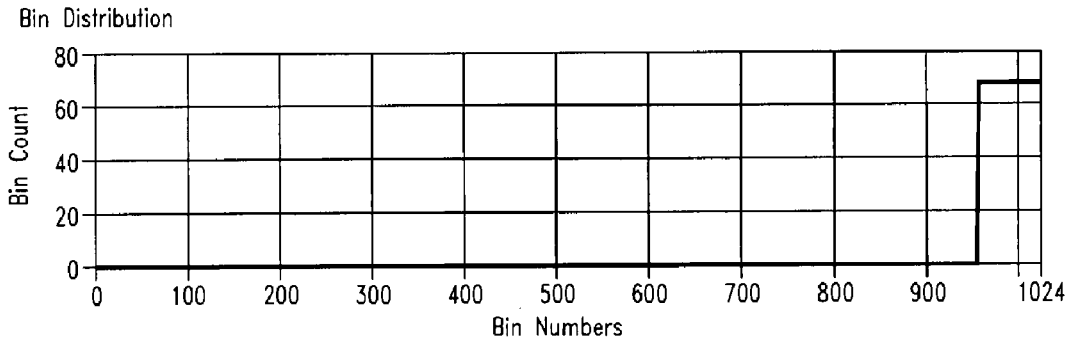
FIG. 8 is a histogram for a null image where no data are captured from the detector output.

With respect to FIG. 8, a histogram for a null image is shown, where no data are captured from the detector output. In FIG. 8, 950 FIFO bins of valid data have been captured, the reference point insert activated and the remaining bins 951 to 1023 now contain a "brick wall" of logical "1"s. As is reflected, the bin count ramps up to the maximum at the alignment reference point insertion, i.e., 950.

Turning to FIGS. 9a-9d, FIG. 9a shows an exemplar data set prior to reference point correction where the laser echo return indicated by a "1" physically occurs at bin 150 but due to layer jitter, the individual layers acquire the echoes as offset in varying amounts with respect to each other.

The corresponding alignment reference point data would then appear as that illustrated in FIG. 9b where the predetermined reference insert time is designated as occurring at about the time bin 950 receives digitized detector data. In other words, the user selectively defines a time period or number of clock cycles at which point the reference line is asserted so as to insert the brick wall into the bins in each of the layers or channels. For example, where each bin represents about 500 picoseconds in a 2 GHz clock system, a user can define the reference insert line to assert at, for instance, 475 nanoseconds, which translates to a brick wall insert at about bin number 950.

The correction offset table is shown in FIG. 9c, showing the number of bins a layer's data must be moved to align the data set to the other layers' data sets.

FIG. 9d illustrates how the jitter correction operates where the acquired image data is located around bin 150 once the images in each layer have been moved by the number of bins calculated as a correction amount. The brick wall is shown from bin 950 to the remaining number of bins in the register.

Exemplar outputs of pre-histogram processing and post-histogram processing of null image data in an eight layer module are shown in FIGS. 10a and 10b respectively. As is seen, the bin count increase at the alignment reference point of bin 950 is much steeper in the corrected figure indicating the data alignment shift.

Appropriate reference point synchronization circuit means, such as an FPGA is incorporated with output circuit means, such as multiplexing circuitry for the receiving of and synchronizing of the outputted digitized data values of the FIFO shift registers on one or more of said layers using the inserted reference points for generating a plurality of synchronized digitized data values.

The digitized and aligned data values are further processed by suitable post-processing circuitry 100 to create a 3 D point cloud for producing an image.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. An electronic circuit [comprised of] *comprising*:

*a* photon detector array [means for converting] *configured to convert* photons [to] *into* a detector output signal[.];

a plurality of readout electronics integrated circuit chips, each readout electronics integrated circuit chip [comprising] *including* a plurality of channels [for receiving] *configured to receive* and [processing] *process* output signals generated by [said] *the* photon detector array, wherein [said] *the* plurality of readout electronics integrated circuit chips are arranged in a stacked configuration, with each of [said] *the* readout electronics integrated circuit chips forming one layer of [said] *the* stacked configuration, *and* wherein [said] *the* photon detector array is bonded to a lateral surface of [said] *the* stacked configuration perpendicular to [said] *the* stacked configuration and *is* connected to the plurality of channels via a plurality of T-connects disposed on [said] *the* lateral surface of [said] *the* stacked configuration[.];

wherein at least two of [said] *the plurality of* channels [comprise,] *include:*

*a* converting circuit [means for converting said] *configured to convert the* detector output signal [to] *into* a digitized data value [comprised of] *comprising* one or more digital bits [comprising] *including* an image data set, wherein each digital bit has a position in [said] *the* image data set[.];

*a* reference insert circuit [means for inserting] *configured to insert* one or more user-defined reference points at one or more predetermined positions in [said] *the* image data set[.]; and[.]

*a* reference point synchronization circuit [means for synchronizing] *configured to synchronize* at least one of [said] *the* user-defined reference points with at least one other of [said] *the* user-defined reference points in [each] *the image data sets* of at least two of [said channels' image data sets] *the plurality of channels*.

2. The electronic circuit of claim 1, *further* comprising [at least one FIFO] *a first-in, first out* (*FIFO*) shift register [for storing said] *configured to store the* image data set.

3. The electronic circuit of claim 1, [where said] *wherein the* reference point synchronization [means] *circuit* is a [field programmable] *field-programmable* gate array.

4. The electronic circuit of claim 1, wherein [said] *the at least* two *of the plurality of* channels are each defined upon one integrated circuit chip.

5. The electronic circuit of claim 1, wherein each of [said] *the at least* two *of the plurality* channels are defined upon separate integrated circuit chips.

6. An electronic circuit [comprised of] *comprising*:

[an electronic sensor] *a photon detector array* having an output[.];

a plurality of readout electronics integrated circuit chips, each readout electronics integrated circuit chip [comprising] *including* a plurality of channels [for receiving and processing] *configured to receive and process* output signals generated by [said] *the* photon detector array, wherein [said] *the* plurality of readout electronics integrated circuit chips are arranged in a stacked configuration, with each of [said] *the* readout electronics integrated circuit chips forming one layer of [said] *the* stacked configuration, *and* wherein [said] *the* photon detector array is bonded to a lateral surface of [said] *the* stacked configuration perpendicular to [said] *the* stacked configuration and *is* connected to the plurality of channels via a plurality of T-connects disposed on [said] *the* lateral surface of [said] *the* stacked configuration[,];

wherein at least two of [said] *the* layers [comprise] *include:* sensor converting [means for converting] *circuitry configured to convert* the output of [said] *the* electronic sensor [to] *into* a digitized data value[,];

*a* storage circuit [means for the storing of said] *configured to store the* digitized data value, [said] *the* storage circuit [means] comprising a plurality of individual bin [circuit means] *circuits*, each of [said] *the* bin [circuit means] *circuits* having a variable logic state and [each having] a storage circuit [means] position[,];

a reference insert circuit [for selectively asserting] *configured to selectively assert* a predetermined bin logic state in [said at least one] *a* preselected bin circuit [means], whereby a user-defined reference point may be selectively asserted at the respective storage circuit [means] positions on each of [said] *the* layers[,];

*an* output circuit [means for the outputting of said] *configured to output the* digitized data value[,]; and[,]

*a* reference point synchronization circuit [means for the receiving of and synchronizing of said] *configured to receive and synchronize the* outputted digitized data values using [said] *the* reference points [for generating] *to generate* a plurality of synchronized digitized data values.

7. The electronic circuit of claim 6, wherein [said] *the* storage circuit [means is comprised of] *comprises* a [FIFO] *first-in, first-out* (*FIFO*) shift register.

8. The electronic circuit of claim 6, wherein [said synchronizing] *the reference point synchronization circuit* is [performed in] a [field programmable] *field-programmable* gate array.

*9. An electronic circuit comprising:*

*a photon detector array configured to convert photons into a detector output signal; and*

*a processing module including a plurality of readout electronics integrated circuit chips (ROICs), wherein each ROIC comprises a plurality of channels configured to receive and process the detector output signal generated by the photon detector array, and wherein the plurality of channels are further configured to convert the detector output signal into an image data set including at least one digital bit;*

*wherein the plurality of ROICs are arranged in a stacked configuration with each ROIC forming a layer of the stacked configuration; and*

*wherein the photon detector array is bonded to a lateral surface of the stacked configuration substantially perpendicular to the stacked configuration and is connected to each channel of the plurality of channels via a respective T-connect disposed on the lateral surface of the stacked configuration.*

*10. The electronic circuit of claim 9, wherein a channel of the plurality of channels comprises a converting circuit configured to convert the detector output signal into an image data set including a digital bit, and wherein the digital bit has a position in the image data set.*

*11. The electronic circuit of claim 10, wherein a channel of the plurality of channels comprises:*

*a reference insert circuit configured to insert a user-defined reference points at a predetermined position in the image data set; and*

*a reference point synchronization circuit configured to synchronize a first user-defined reference point of a first image data set with a second user-defined reference point of a second image data set.*

*12. The electronic circuit of claim 11, wherein the reference point synchronization circuit is further configured to perform a histogram calculation based on at least two inserted user-defined reference points.*

*13. The electronic circuit of claim 11, wherein the reference point synchronization circuit is field-programmable gate array.*

*14. The electronic circuit of claim 9, further comprising metallized traces configured to electrically connect electronic contacts of the plurality of ROICs to access leads of the respective layers of the stacked configuration.*

*15. The electronic circuit of claim 9, wherein the respective electrical connection disposed on the lateral surface of the stacked configuration is a T-connect structure.*

*16. The electronic circuit of claim 9, further comprising comparator circuitry configured to determine if the detector output signal is above or below a predetermined threshold.*

*17. The electronic circuit of claim 9, further comprising a storage circuit configured to store the image data set.*

*18. The electronic circuit of claim 17, wherein the storage circuit comprises a first-in, first-out (FIFO) shift register.*

*19. The electronic circuit of claim 17, wherein the storage circuit comprises a plurality of bin circuits, each bin circuit having a variable logic state and a unique position in the storage circuit.*

*20. The electronic circuit of claim 19, further comprising a reference insert circuit configured to assert a predetermined bin logic state in at least one of the plurality of bin circuits and to insert a reference point into the image data set.*

*21. The electronic circuit of claim 20, further comprising an output circuit configured to output the image data set.*

*22. The electronic circuit of claim 21, further comprising a reference point synchronization circuit configured to receive and synchronize digitalized data values of the outputted image data set using the inserted reference points.*

*23. The electronic circuit of claim 9, wherein the plurality of channels are defined upon one integrated circuit chip.*

*24. The electronic circuit of claim 9, wherein a first subset of the plurality of channels are defined upon a first integrated circuit chip, and wherein a second subset of the plurality of channels are defined upon a second integrated circuit chip.*

*25. A method comprising:*

*converting received photons into a detector output signal using a photon detector array;*

*receiving and processing the detector output signal generated by the photon detector array at a first channel of a readout electronics integrated circuit (ROIC) of a processing module;*

*converting the output signal into an image data set at the first channel of the ROIC of the processing module, wherein the image data set includes a digital bit, wherein the ROIC is arranged in a stacked configuration with a plurality of other ROICs, and wherein the photon detector array is bonded to a lateral surface of the stacked configuration and is connected to each channel of a plurality of channels via a respective T-connect disposed on the lateral surface of the stacked configuration;*

*inserting a first user-defined reference point at a position in the image data set, wherein said inserting a first user-defined reference point includes asserting a predetermined bin logic state in a bit circuit of a storage circuit configured to store the image data set; and*

*synchronizing the first user-defined reference point with a second user-defined reference point associated with an integrated circuit layer of the processing module.*

*26. The method of claim 25, further comprising receiving photons reflected from a target.*

*27. The method of claim 25, further comprising performing a histogram calculation at a field-programmable gate array (FPGA) to determine positions of the first and second user-defined reference points and to define a realignment point for the image data set.*

*28. The method of claim 25, further comprising storing the image data set in the storage circuit.*

*29. The method of claim 28, wherein the storage circuit is a first-in, first-out (FIFO) shift register.*

*30. The method of claim 28, further comprising multiplexing the stored image data set to external processing circuitry.*

*31. The method of claim 25, further comprising determining via a comparator circuit if the detector output signal exceeds a predetermined threshold.*

*32. The method of claim 25, wherein said synchronizing comprises realigning the inserted first user-defined reference point with the second user-defined reference point to shift the image data set corresponding to the ROIC into alignment with another image data set corresponding to another ROIC of the plurality of other ROICs.*

* * * * *

UNITED STATES PATENT AND TRADEMARK OFFICE

CERTIFICATE OF CORRECTION

PATENT NO. : RE43,722 E
APPLICATION NO. : 12/607253
DATED : October 9, 2012
INVENTOR(S) : Kennedy et al.

It is certified that error appears in the above-identified patent and that said Letters Patent is hereby corrected as shown below:

On the Title Page, in Item (57), under "ABSTRACT", in Column 2, Line 5, delete "though" and insert -- through --, therefor.

On the Title Page, in Figure, delete "ECHOS INTEGRATE" and insert -- ECHOES INTEGRATE --, therefor.

On the Title Page, in Figure, delete "FIRST ECHOS" and insert -- FIRST ECHO --, therefor.

In the Drawings

In Fig. 1, Sheet 1 of 6, delete "ECHOS INTEGRATE" and insert -- ECHOES INTEGRATE --, therefor.

In Fig. 1, Sheet 1 of 6, delete "FIRST ECHOS" and insert -- FIRST ECHO --, therefor.

In Fig 9b, Sheet 6 of 6, delete " Bin 992 " and insert -- Bin 952 --, therefor.

In Fig 9d, Sheet 6 of 6, delete " Bin 992 " and insert -- Bin 952 --, therefor.

In the Specifications

In Column 1, Line 21, delete "patent application Ser." and insert -- [patent application Ser.] Patent Application --, therefor.

Signed and Sealed this
Seventh Day of May, 2013

Teresa Stanek Rea
*Acting Director of the United States Patent and Trademark Office*

In Column 3, Line 55, delete “invention” and insert -- invention. --, therefor.

In Column 8, Line 7, delete “ofpixels)(1)” and insert -- of pixels)(1) --, therefor.

In the Claims

In Column 12, Line 15, in Claim 13, delete “circuit is” and insert -- circuit is a --, therefor.

In Column 12, Line 43, in Claim 22, delete “digitalized” and insert -- digitized --, therefor.